(12) United States Patent
Ohashi et al.

(10) Patent No.: US 11,286,707 B2
(45) Date of Patent: Mar. 29, 2022

(54) OPENING AND CLOSING SYSTEM

(71) Applicants: MITSUI KINZOKU ACT CORPORATION, Yokohama (JP); GECOM CORPORATION, Greensburg, IN (US)

(72) Inventors: Michio Ohashi, Yokohama (JP); Satoru Nishizawa, Yokohama (JP); Takashi Teraoka, Novi, MI (US)

(73) Assignees: MITSUI KINZOKU ACT CORPORATION, Yokohama (JP); GECOM CORPORATION, Greensburg, IN (US)

( * ) Notice: Subject to any disclaimer, the term of this patent is extended or adjusted under 35 U.S.C. 154(b) by 252 days.

(21) Appl. No.: 16/530,868

(22) Filed: Aug. 2, 2019

(65) Prior Publication Data

US 2020/0040638 A1    Feb. 6, 2020

(30) Foreign Application Priority Data

Aug. 6, 2018   (JP) .............................. JP2018-147904

(51) Int. Cl.
   *E05F 15/73*    (2015.01)
   *B60J 5/10*     (2006.01)
   *F21S 43/00*    (2018.01)

(52) U.S. Cl.
   CPC .............. *E05F 15/73* (2015.01); *B60J 5/107* (2013.01); *E05Y 2900/532* (2013.01); *F21S 43/00* (2018.01)

(58) Field of Classification Search
   CPC . E05F 15/73; B60J 5/107; F21S 43/00; E05Y 2900/532

USPC ........................................................... 701/49
See application file for complete search history.

(56) References Cited

U.S. PATENT DOCUMENTS

| 7,375,299 | B1 * | 5/2008 | Pudney | ................... E05B 81/78 200/61.62 |
| 2003/0102688 | A1 * | 6/2003 | Bingle | ................... E05B 83/26 296/76 |
| 2003/0222758 | A1 * | 12/2003 | Willats | ................... B60R 25/24 340/5.72 |

(Continued)

FOREIGN PATENT DOCUMENTS

| DE | 10123187 A1 | 11/2002 |
| JP | 2004-107893 A | 4/2004 |

(Continued)

*Primary Examiner* — Kerri L McNally
*Assistant Examiner* — Thang D Tran
(74) *Attorney, Agent, or Firm* — Foley & Lardner LLP (57) ABSTRACT

An opening and closing system includes a first human detection sensor configured to detect a vehicle user who enters a first area defined on a periphery of a vehicle body, a lamp visible by the vehicle user who enters the first area, and a control device configured to control an unlocking operation of the lock device, a closing operation of the striker device, a pop-up operation of the striker device, and switching on and off of the lamp. The control device switches on the lamp when the vehicle user is detected by the first human detection sensor and starts the controlling of the unlocking operation of the lock device and the closing operation and the pop-up operation of the striker device in response to the lamp being switched on.

4 Claims, 10 Drawing Sheets

(56) References Cited

U.S. PATENT DOCUMENTS

| | | | | |
|---|---|---|---|---|
| 2005/0046200 | A1* | 3/2005 | Dominique | E05B 83/16 292/216 |
| 2005/0151635 | A1* | 7/2005 | Burkat | E05B 81/76 340/445 |
| 2005/0156447 | A1* | 7/2005 | Bishop | E05B 17/0037 296/76 |
| 2005/0241237 | A1 | 11/2005 | Hirai et al. | |
| 2007/0146120 | A1* | 6/2007 | Kachouh | G07C 9/00309 340/5.72 |
| 2007/0205863 | A1* | 9/2007 | Eberhard | B60R 25/2054 340/5.72 |
| 2008/0314097 | A1* | 12/2008 | Rohlfing | E05B 81/78 70/256 |
| 2009/0107050 | A1* | 4/2009 | Suzuki | E05F 15/70 49/360 |
| 2009/0160211 | A1* | 6/2009 | Krishnan | E05B 81/78 296/146.4 |
| 2010/0064588 | A1* | 3/2010 | Jitsuishi | E05B 81/20 49/358 |
| 2010/0244698 | A1* | 9/2010 | Nakamura | B60Q 1/24 315/77 |
| 2011/0154740 | A1* | 6/2011 | Matsumoto | E05B 81/66 49/359 |
| 2011/0276234 | A1* | 11/2011 | Van Gastel | E05B 81/78 701/49 |
| 2012/0319502 | A1* | 12/2012 | Van Gastel | B60R 25/00 307/116 |
| 2013/0006470 | A1* | 1/2013 | Van Gastel | H03K 17/00 701/36 |
| 2014/0207344 | A1* | 7/2014 | Ihlenburg | E05F 15/74 701/49 |
| 2014/0218521 | A1* | 8/2014 | Tanaka | B60Q 1/24 348/148 |
| 2014/0330486 | A1* | 11/2014 | Gehin | B60R 25/01 701/49 |
| 2015/0025751 | A1* | 1/2015 | Sugiura | B60J 5/06 701/49 |
| 2015/0062941 | A1* | 3/2015 | Sura | B60Q 3/82 362/488 |
| 2015/0218857 | A1* | 8/2015 | Hamada | E05B 81/16 292/194 |
| 2015/0292253 | A1* | 10/2015 | Hartmann | E05F 15/695 701/49 |
| 2015/0325066 | A1* | 11/2015 | Muller | E05B 81/04 340/5.61 |
| 2015/0330112 | A1* | 11/2015 | Van Wiemeersch | E05B 81/76 292/201 |
| 2016/0001700 | A1* | 1/2016 | Salter | B60Q 1/24 362/510 |
| 2016/0137165 | A1* | 5/2016 | Schindler | E05B 81/77 701/36 |
| 2016/0319585 | A1* | 11/2016 | Goto | E05B 81/06 |
| 2017/0080785 | A1* | 3/2017 | Azarko | B60R 13/105 |
| 2017/0106836 | A1* | 4/2017 | Sobecki | G06F 3/04817 |
| 2017/0114586 | A1* | 4/2017 | Tokudome | B60R 25/2036 |
| 2017/0174179 | A1* | 6/2017 | Schumacher | B60R 16/0231 |
| 2017/0182933 | A1* | 6/2017 | Kiriyama | B60Q 1/0023 |
| 2017/0182975 | A1* | 6/2017 | Monig | B60R 25/24 |
| 2017/0267213 | A1* | 9/2017 | Berezin | B60K 37/06 |
| 2017/0298659 | A1* | 10/2017 | Watanabe | E05B 77/48 |
| 2017/0342761 | A1* | 11/2017 | Conner | E05F 15/71 |
| 2018/0009303 | A1* | 1/2018 | Romero Regalado | B60J 11/025 |
| 2018/0065545 | A1* | 3/2018 | McMahon | B60Q 1/30 |
| 2018/0080270 | A1* | 3/2018 | Khan | E05F 15/611 |
| 2018/0319642 | A1* | 11/2018 | Pronger | B60P 1/50 |
| 2018/0355643 | A1* | 12/2018 | Taurasi | E05B 85/01 |
| 2018/0371823 | A1* | 12/2018 | Sugiura | B60Q 1/2696 |
| 2019/0024421 | A1* | 1/2019 | Cumbo | E05B 81/76 |
| 2019/0063139 | A1* | 2/2019 | Brogan | B60J 5/0411 |
| 2019/0292838 | A1 | 9/2019 | Tokudome | |
| 2019/0315267 | A1* | 10/2019 | Salter | B60Q 1/24 |
| 2020/0024886 | A1* | 1/2020 | Tamura | B60J 5/06 |

FOREIGN PATENT DOCUMENTS

| | | |
|---|---|---|
| JP | 6167713 B2 | 7/2017 |
| WO | WO-2018/100886 A1 | 6/2018 |

* cited by examiner

OPENING AND CLOSING SYSTEM

CROSS-REFERENCE TO RELATED APPLICATIONS

This application is based on and claims priority under 35 USC 119 from Japanese Patent Application No. 2018-147904 filed on Aug. 6, 2018, the contents of which are incorporated herein by reference.

TECHNICAL FIELD

The present disclosure relates to an opening and closing system for a door of a vehicle such as a motor vehicle.

BACKGROUND

In vehicles such as motor vehicles, a vehicle door such as a trunk lid is kept closed by engagement of a lock device provided on the vehicle door with a striker device provided on a vehicle body. An unlocking switch of the lock device on the trunk lid is typically provided on a surface of the trunk lid that is externally hardly visible such as a downwardly facing surface of the trunk lid at a rear end thereof so as not to deteriorate the aesthetic external appearance of the vehicle. Thus, a vehicle user has to run a user's hand along the downwardly facing surface of the trunk lid to search for the unlocking switch or to bend a user's body to visually confirm the position of the unlocking switch when the vehicle user attempts to open the trunk lid. There is also known an opening and closing system that can make a vehicle user free from the complex and troublesome operation for unlocking the trunk lid.

An opening and closing system described in Japanese Patent No. 6167713 (PTL 1) includes a sensor, a control device, and a driving device configured to cause a trunk lit to pop up to open. A vehicle user lifts up one of a user's feet to place it underneath a lower portion of a vehicle body, and then, the sensor detects the foot of the vehicle user. This unlocks the trunk lid without involvement of the vehicle user who otherwise has to touch the unlocking switch.

SUMMARY

A vehicle user such as an old vehicle user, a female vehicle user in her pregnancy or a disabled vehicle user may have difficulty in lifting up the foot to place it underneath the lower portion of the vehicle body from time to time. The trunk lid is unlocked and is then caused to pop up to open after the occupant comes so close to the vehicle door as for the occupant to lift up a user's foot to place it underneath the lower portion of the vehicle body. Thus, the vehicle user has to keep waiting in front of the trunk lid from the trunk lid is unlocked until the trunk lid is caused to pop up to open. In this way, with the opening and closing system of PTL 1, there is still room for improvement in convenience.

Illustrative aspects of the present disclosure provide an opening and closing system that can enhance the convenience.

According to one aspect of the present disclosure, there may be provided an opening and closing system comprising: a lock device provided on a vehicle door, the lock device being configured to lock the vehicle door in a closed state and to perform an unlocking operation; a striker device provided on a vehicle body, the striker device being configured to perform: a closing operation comprising moving the vehicle door to a closed position; and a pop-up operation comprising moving the vehicle door in an opening direction from the closed position to a pop-up position; a first human detection sensor configured to detect a vehicle user who enters a first area defined on a periphery of the vehicle body; at least one lamp visible by the vehicle user who enters the first area; and a control device configured to: control the unlocking operation of the lock device, the closing operation and the pop-up operation of the striker device, and switching on and off of the lamp; in a case the vehicle user is detected by the first human detection sensor, switch on the lamp; and in response to the lamp being switched on, start the controlling of the unlocking operation of the lock device and the closing operation and the pop-up operation of the striker device.

According to the disclosure, the opening and closing system that can enhance the convenience may be provided.

BRIEF DESCRIPTION OF DRAWINGS

Illustrative embodiment(s) of the present disclosure will be described in detail based on the following figures, wherein.

DETAILED DESCRIPTION

In the following description, a traveling direction of a vehicle is referred to as a front-rear direction of the vehicle, a direction at right angles to the front-rear direction of the vehicle in a plane parallel to a running plane of the vehicle is referred to as a width direction of the vehicle (or a left-right direction of the vehicle), and a direction at right angles to the front-rear direction of the vehicle and the width direction of the vehicle is referred to as an up-down direction of the vehicle.

Figure 1:
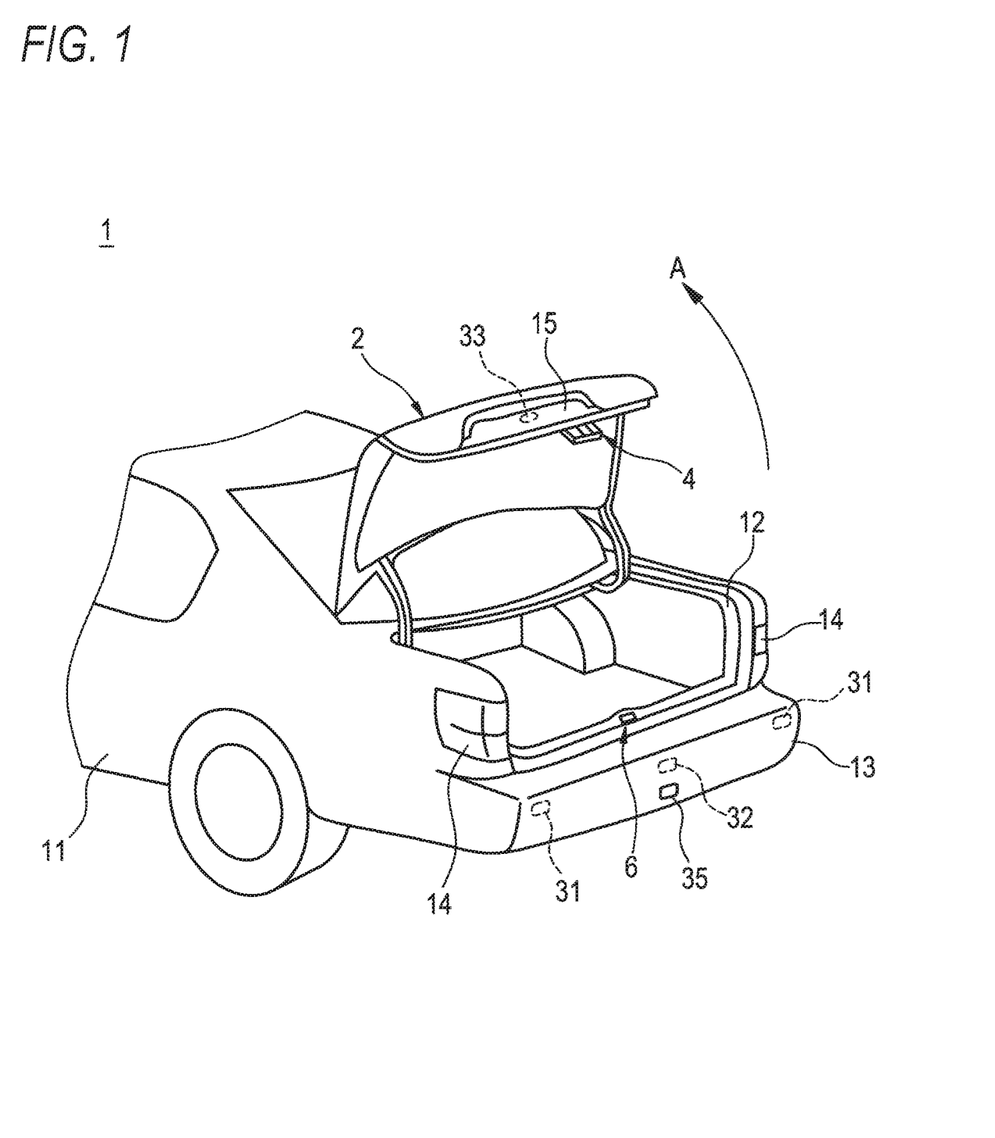
FIG. 1 is a perspective view of an example of a vehicle for explaining an embodiment of the disclosure.
Figure 2:
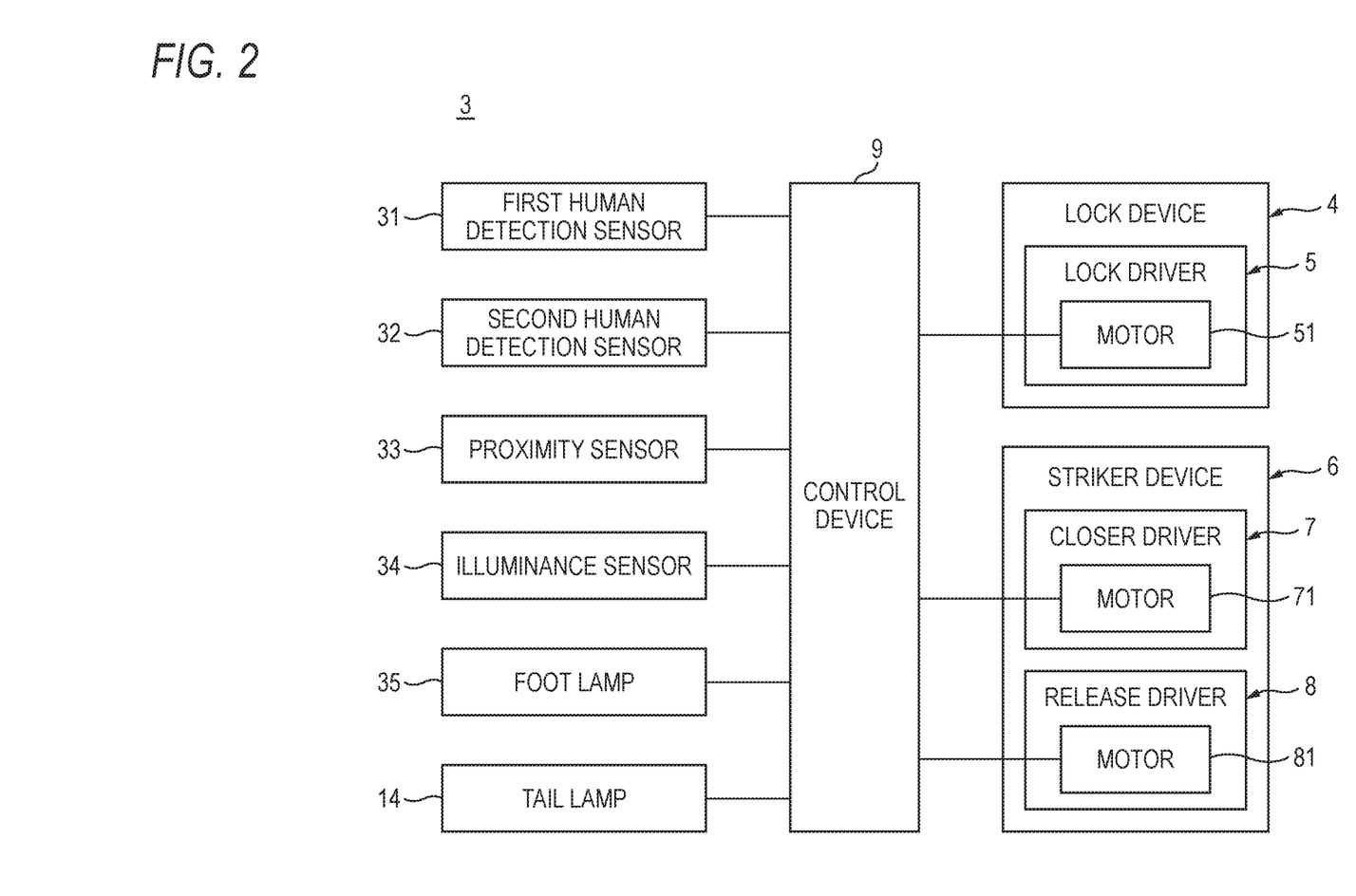
FIG. 2 is a block diagram of an opening and closing system mounted on the vehicle shown in FIG. 1.

FIG. 1 shows an example of a vehicle for explaining an embodiment of the disclosure, and FIG. 2 shows an example of an opening and closing system mounted on the vehicle shown in FIG. 1.

The vehicle 1 includes a trunk lid 2 as an example of a vehicle door. The trunk lid 2 is disposed on a lid frame 12 that constitutes an opening portion provided at a rear portion of a vehicle body 11 and is coupled to the vehicle body 11 in such a manner as to be opened in a direction indicated by an arrow A in FIG. 1. An operation portion 15 is recessed into a central portion of a rear surface of the trunk lid 2. A vehicle user opens the trunk lid 2 by, for example, placing a user's hand on the operation portion 15.

An opening and closing system 3 mounted on the vehicle 1 is used to open and close the trunk lid 2. The opening and closing system 3 includes a lock device 4, a striker device 6, and a control device 9. The lock device 4 is provided on the trunk lid 2, and the striker device 6 is provided on the lid frame 12 of the vehicle body 11. The lock device 4 and the striker device 6 are brought into engagement with each other as the trunk lid 2 is closed, and the trunk lid 2 can be held in a closed state by the engagement of the lock device 4 with the striker device 6.

The lock device 4 is configured to lock the trunk lid 2 so as not to be opened and can be controlled in operation when performing an unlocking operation. The striker device 6 can be controlled in operation when performing a closing operation in which the trunk lid 2 is moved to a closed position and a pop-up operation in which the trunk lid 2 is moved from the closed position to a pop-up position when brought into engagement with the lock device 4. The control device 9 controls the operation of the lock device 4 when the lock device 4 performs the unlocking operation, and the control device 9 controls the operation of the striker device 6 when the striker device 6 performs the closing operation and the operation of the striker device 6 when the striker device 6 performs the pop-up operation.

The opening and closing system 3 includes a first human detection sensor 31, a second human detection sensor 32, a proximity sensor 33, an illuminance sensor 34, a foot lamp 35, and an indicator lamp.

The first human detection sensor 31 detects the vehicle user when the vehicle user enters a first area A1 set on a periphery of the vehicle body 11. The second human detection sensor 32 detects the vehicle user when the vehicle user enters a second area A2 set on a periphery of the trunk lid 2. The first area A1 is set, for example, so as to expand to the rear and the left and right of the vehicle body 11. The second area A2 is set, for example, so as not only to expand to the rear of the trunk lid 2 but also to be included in the first area A1. The first human detection sensor 31 and the second human detection sensor 32 are made up, for example, of an infrared sensor, an ultrasonic sensor, or the like and are provided, for example, on a rear bumper 13 of the vehicle body 11.

The proximity sensor 33 detects in a noncontacting fashion that a hand of the vehicle user by which the trunk lid 2 is opened has come closer to the operation portion 15 of the trunk lid 2. The proximity sensor 33 is made up, for example, of an electrostatic capacity sensor, an infrared sensor, or the like and is provided, for example, on the operation portion 15 of the trunk lid 2.

The illuminance sensor 34 detects an illuminance on the periphery of the vehicle body 11. The illuminance sensor 34 is made up, for example, of a phototransistor, a cadmium sulfide cell (CdS), or the like and is provided at an appropriate location on the vehicle body 11.

The foot lamp 35 illuminates an area corresponding to the second area A2 on the ground on the periphery of the trunk lid 2. The foot lamp 35 is made up, for example, of a light emitting diode (LED) lamp, a high intensity discharge (HID) lamp, or the like and is provided, for example, on the rear bumper 13 of the vehicle body 11. In this embodiment, the indicator lamp employs a pair of tail lamps 14 that are provided in the proximity of the trunk lid 2 in a rear part of the vehicle body 11. The vehicle user can visualize the ground illuminated by the tail lamps 14 and the foot lamp 35 when he or she enters the first area A1. The indicator lamp may be made up of a different lamp from the tail lamps 14, and in the case where the indicator lamp is provided separately from the tail lamps 14, the indicator lamp is provided on the trunk lid 2 or in the vicinity of the trunk lid 2.

The control device 9 is configured by a processor such as a central processing unit (CPU) and a memory such as a read only memory (ROM) storing a program to be executed by the processor. On the basis of a signal output from each of the sensors of the first human detection sensor 31, the second human detection sensor 32, the proximity sensor 33, and/or the illuminance sensor 34, the control device 9 is configured to control the lock device 4 to perform an unlocking operation, control the striker device 6 to perform a closing operation, control the striker device 6 to perform a pop-up operation, and control the illumination of the foot lamp 35 and the tail lamps 14.

Next, referring to FIGS. 3 to 5, the configurations of the lock device 4 and the striker device 6 will be described. The trunk lid 2 is omitted from illustration in FIG. 3.

Figure 3:
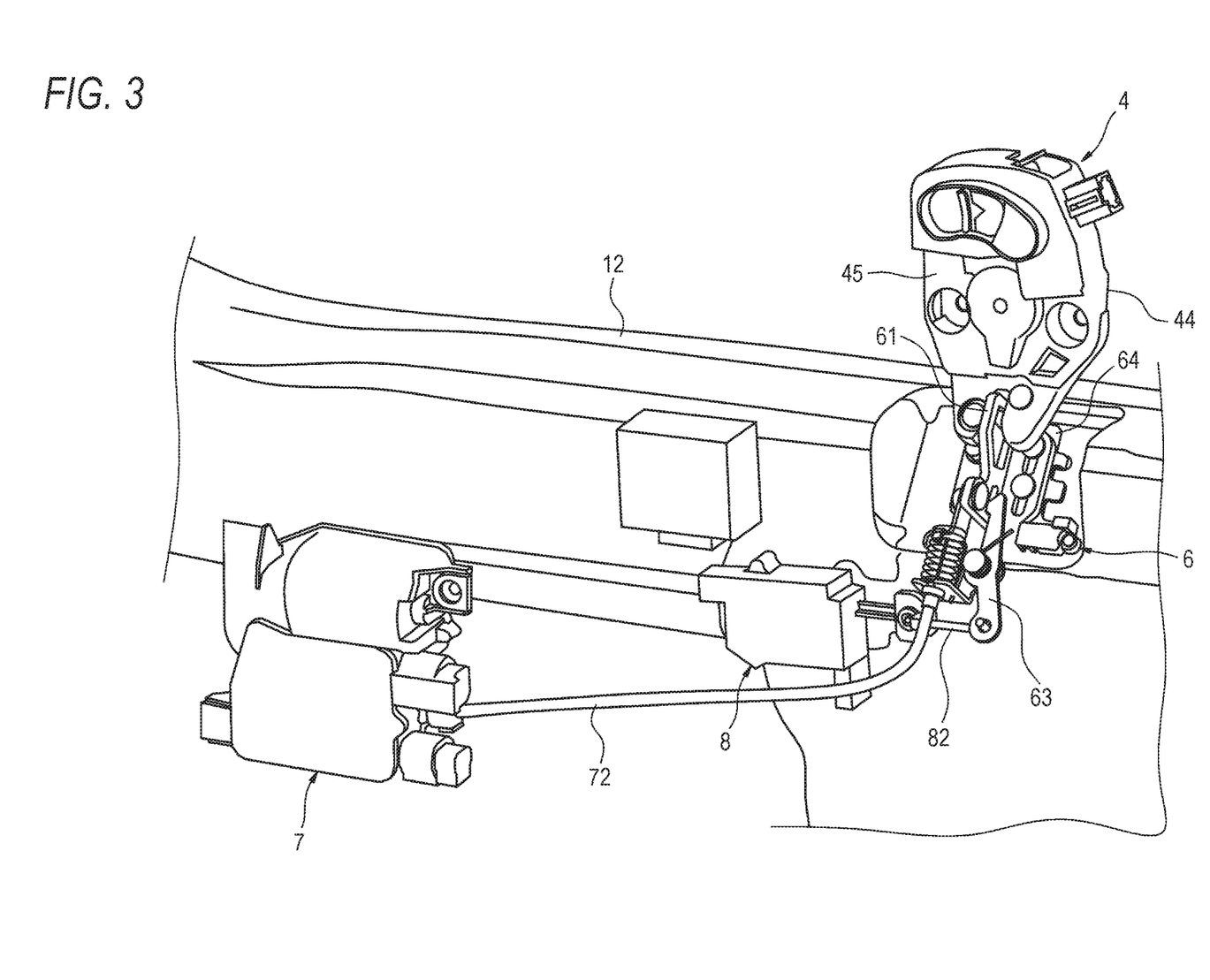
FIG. 3 is a perspective view of a lock device and a striker device of the opening and closing system shown in FIG. 2.
Figure 4:
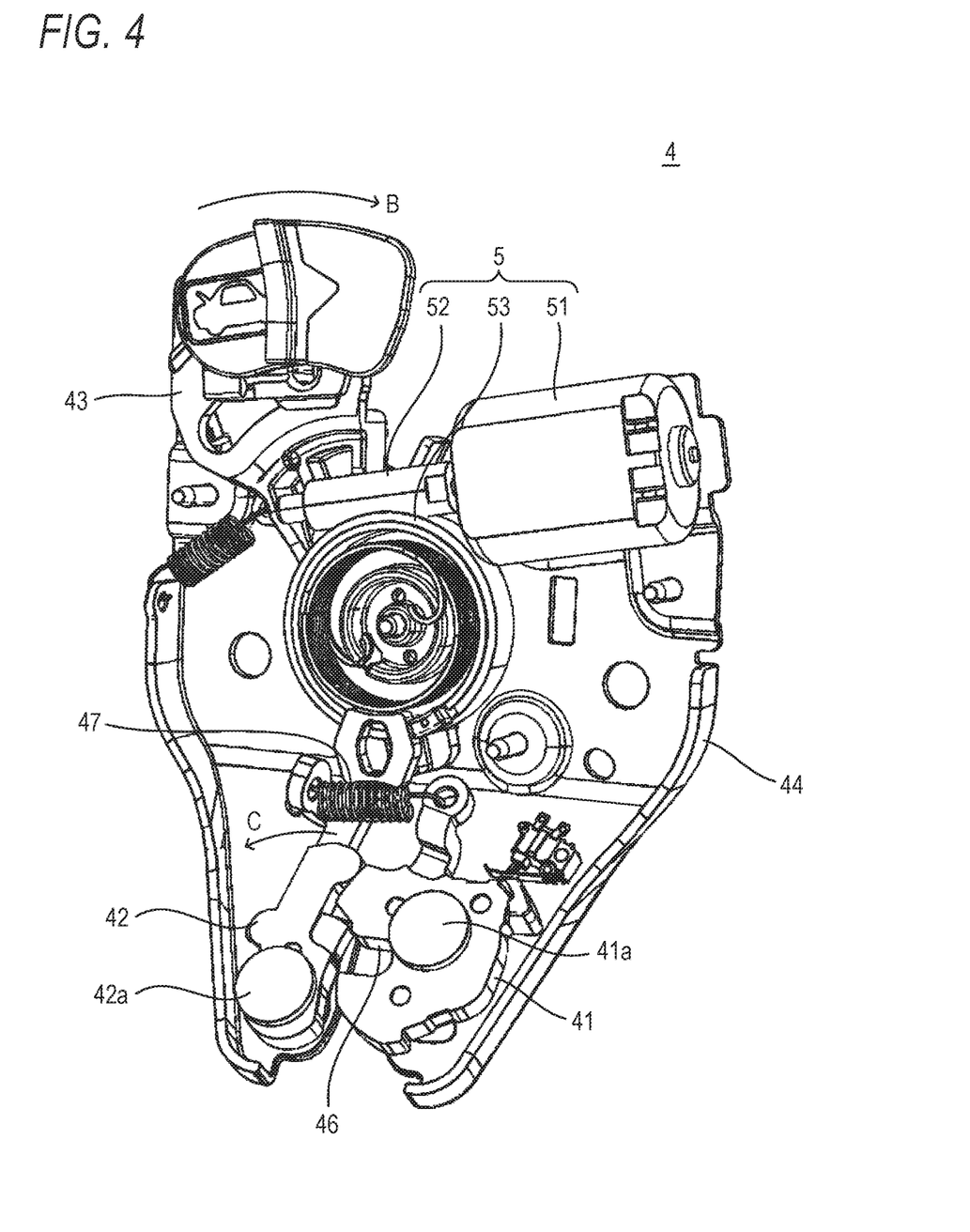
FIG. 4 is a perspective view of the lock device alone shown in FIG. 3.

As shown in FIGS. 3 and 4, the lock device 4 includes a latch 41, a ratchet 42, a lever 43, a base 44, a case 45, and a lock driver 5. The case 45 is omitted from illustration in FIG. 4.

The base 44 is a metallic plate member and supports the latch 41, the ratchet 42, the lever 43, and the lock driver 5 while being fixed to the trunk lid 2. The case 45 is a synthetic resin cover member and is assembled to the base 44, covering the latch 41, the ratchet 42, the lever 43, and the lock driver 5.

The latch 41 locks a striker 61 of the striker device 6. The latch 41 includes a locking groove 46 that the striker 61 can enter and is provided so as to move between an unlocking position where the striker 61 can enter the locking groove 46 and a locking position where the striker 61 enters the locking groove 46 to be kept unable to leave from the locking groove 46. The movement of the latch 41 between the locking position and the unlocking position becomes a rotational movement around a rotational shaft 41a provided on the base 44 so as to be erected therefrom.

The ratchet 42 is provided so as to move between a locking position where the ratchet 42 locks the latch 41 that has moved to the locking position and prevents the latch 41 from moving toward the unlocking position from the locking position to a releasing position where the ratchet 42 releases the latch 41. The movement of the ratchet 42 between the locking position and the releasing position becomes a rotational movement around a rotational shaft 42a provided on the base 44 so s to be erected therefrom.

A coil spring 47 is provided between the ratchet 42 and the latch 41 so as to span a space defined therebetween. The latch 41 is biased from the locking position toward the unlocking position by the coil spring 47 when the ratchet 42 stays in the releasing position, while the ratchet 42 is biased from the releasing position toward the locking position by the coil spring 47 when the latch 41 stays in the locking position.

The lever 43 moves the ratchet 42 from the locking position toward the releasing position, and the lock driver 5 activates the lever 43 to operate. The lock driver 5 includes a motor 51, a worm 52 fixed to an output shaft of the motor 51, and a worm wheel 53 that meshes with the worm 52. A cam (not shown) is provided on a rear side of the worm wheel 53, and this cam is brought into sliding contact with the lever 43. The motor 51 is controlled by the control device 9.

The motor 51 of the lock driver 5 is driven to rotate the worm wheel 53 by the control device 9 when the lock device 4 performs an unlocking operation. The lever 43 is pressed against the cam that rotates together with the worm wheel 53, whereby the lever 43 rotates in a direction indicated by an arrow B in FIG. 4. Then, the ratchet 42 is pressed against by the lever 43, whereby the ratchet 42 rotates in a direction indicated by an arrow C in FIG. 4 and is moved from the locking position to the releasing position. This moves the latch 41 to the unlocking position, whereby the striker 61 that has entered the locking groove 46 is now allowed to leave from the locking groove 46.

Figure 5:
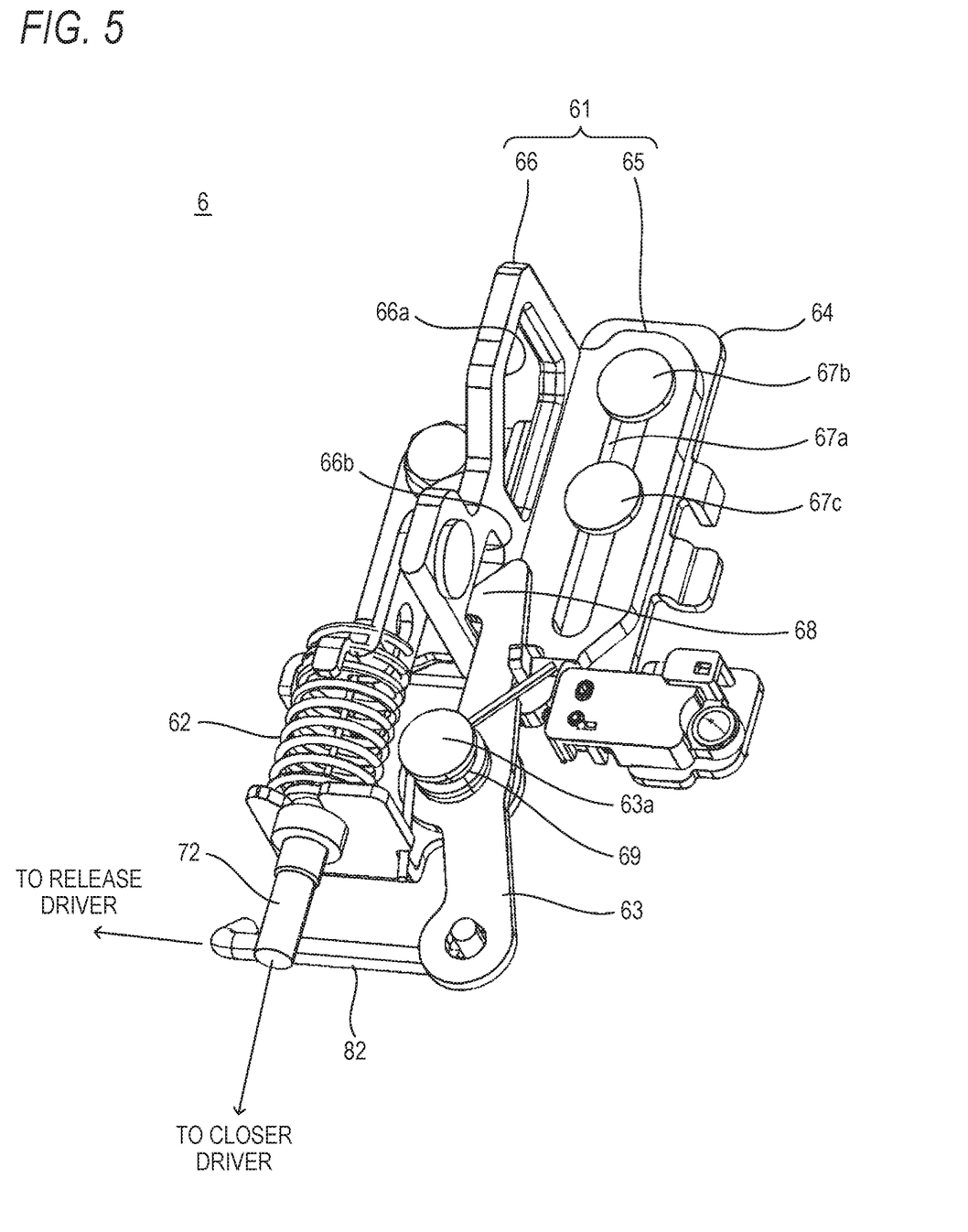
FIG. 5 is a perspective view of a main part of the striker device shown in FIG. 3.

As shown in FIGS. 4 and 5, the striker device 6 includes the striker 61, a biasing member 62, a hook 63, a base 64, a closer driver 7, and a release driver 8. In FIG. 5, the closer driver 7 and the release driver 8 are omitted from illustration.

The base 64 is a metallic plate member and supports the striker 61, the biasing member 62, and the hook 63. The base 64 is fixed to the lid frame 12.

The striker 61 includes a slider portion 65 and an engagement portion 66. An elongated hole 67a is formed in the slider portion 65 in such a manner as to extend in an up-down direction that follows an opening and closing direction of the trunk lid 2. A pair of pins 67b, 67c are passed through the elongated hole 67a. The pair of pins 67b, 67c are provided on the base 64 so as to be erected therefrom while being spaced apart from each other in the up-down direction. The striker 61 is supported so as to move in the up-down direction by the elongated hoe 67a in the slider portion 65 and the pair of pins 67b, 67c. The striker 61 is provided so as to move between a closing position where the upper pin 67b is brought into abutment with an upper end of the elongated hole 67a and a pop-up position where the lower pin 67c is brought into abutment with a lower end of the elongated hole 67a. A first engagement hole 66a and a second engagement hole 66b are formed in the engagement portion 66. The first engagement hole 66a is brought into engagement with the latch 41 of the lock device 4, and the second engagement hole 66b is brought into engagement with the hook 63.

The biasing member 62 is made up, for example, of a coil spring and biases the striker 61 from the closing position toward the pop-up position. The hook 63 includes a locking claw 68 and is provided so as to move between a locking position where the locking claw 68 enters the second engagement hole 66b of the striker 61, which is disposed in the closing position, to lock the striker 61 in the closing position and a releasing position where the locking claw 68 releases the striker 61. The movement of the hook 63 between the locking position and the releasing position becomes a rotational movement around a rotational shaft 63a provided on the base 64 so as to be erected therefrom. A torsion spring 69 is attached to the rotational shaft 63a, whereby the hook 63 is biased from the releasing position toward the locking position by the torsion spring 69.

The closer driver 7 includes a motor 71 (refer to FIG. 2) and a cable 72 that is pushed or pulled in response to an operation of the motor 71. One end of the cable 72 is coupled to the striker 61, whereby the striker 61 is moved toward the closing position against the biasing of the biasing member 62 as a result of the cable 72 being pulled. The motor 71 is controlled by the control device 9.

The release driver 8 includes a motor 81 (refer to FIG. 2) and an arm 82 that is pushed or pulled in response to an operation of the motor 81. A leading end portion of the arm 82 is coupled to the hook 63, whereby the hook 63 is moved toward the releasing position against the biasing of the torsion spring 69 as a result of the arm 82 being pulled. The motor 81 is controlled by the control device 9.

Figure 6:
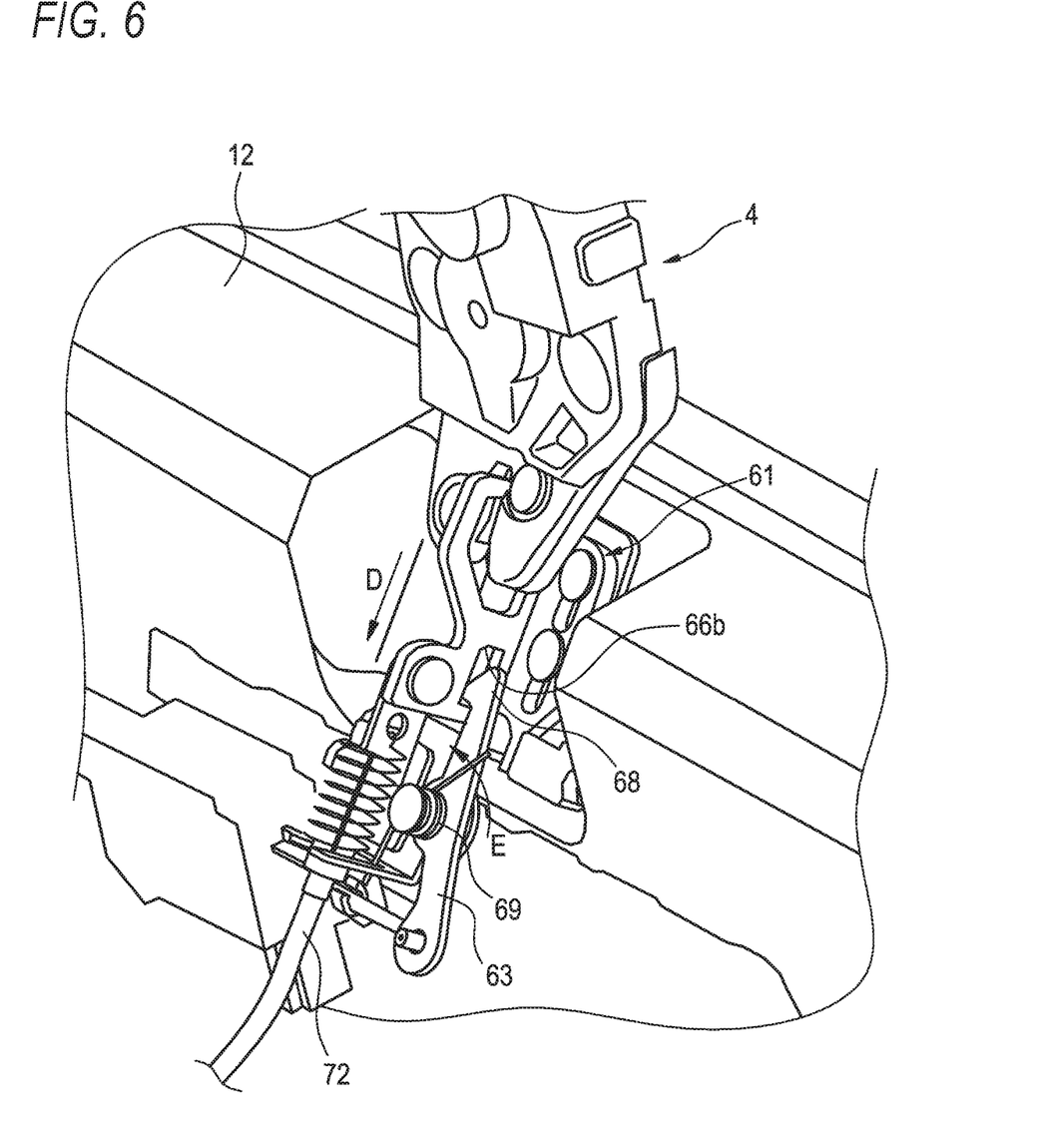
FIG. 6 is a perspective view explaining a closing operation of the striker device shown in FIG. 5.
Figure 7:
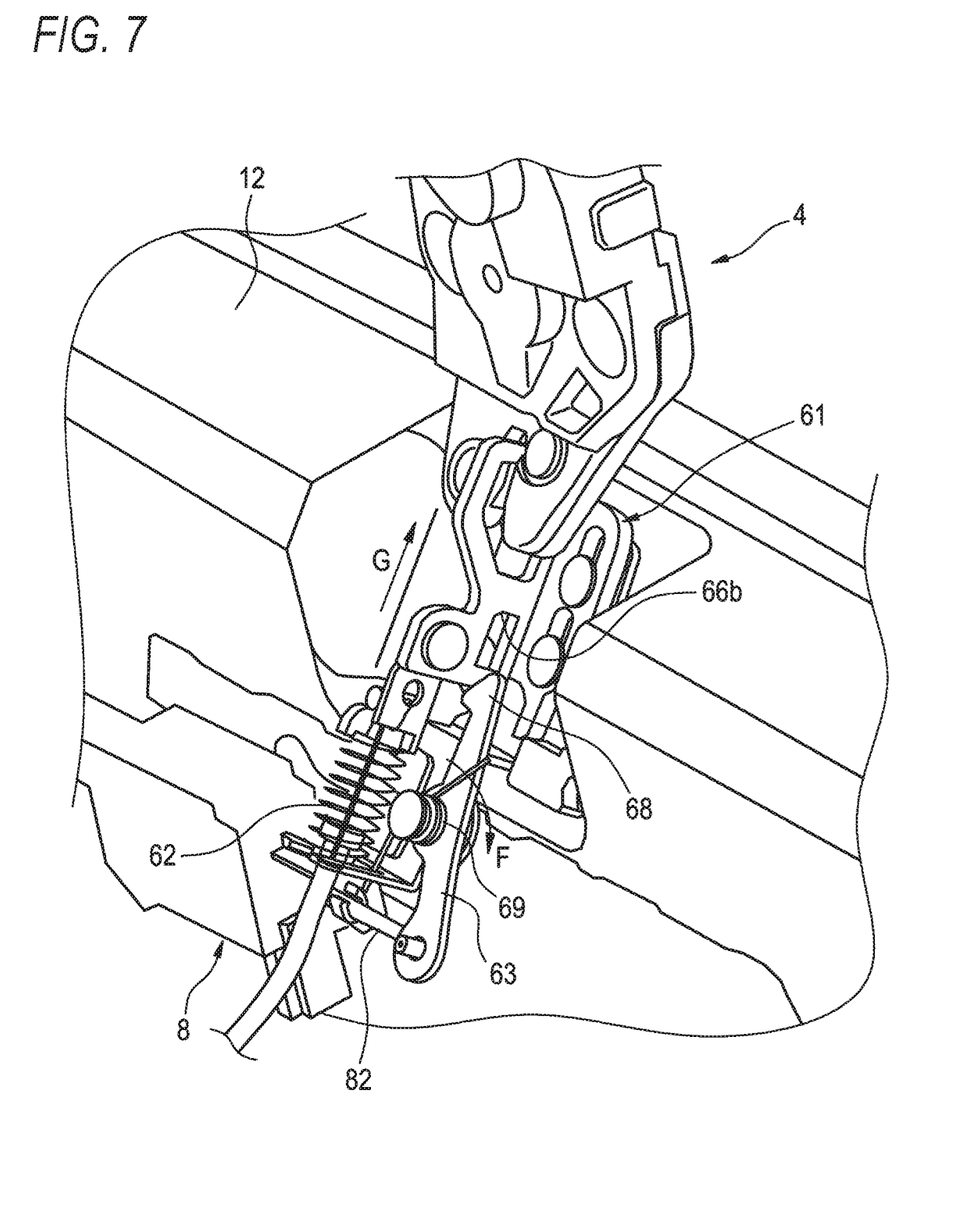
FIG. 7 is a perspective view explaining a pop-up operation of the striker device shown in FIG. 5.

Next, referring to FIGS. 6 and 7, the closing operation and the pop-up operation of the striker device 6 will be described. In FIGS. 6 and 7, the trunk lid 2 is omitted from illustration.

Firstly, let's assume that the trunk lid 2 is opened and the striker 61 of the striker device 6 is disposed in the pop-up position. The striker 61 enters the locking groove 46 of the latch 41 of the lock device 4 as the trunk lid 2 is closed. The latch 41 is pressed against by the striker 61 to thereby rotate, whereby the latch 41 is moved from the unlocking position toward the locking position. The ratchet 42 is moved to the locking position as a result of the latch 41 being disposed in the locking position. As a result, the latch 41 is locked in the locking position, and the striker 61 is prevented from leaving the locking groove 46, whereby the trunk lid 2 is locked so as not to be opened. A locked state of the trunk lid 2 is detected by a switch that is switched ON or OFF as a result of, for example, the latch 41 being moved to the locking position, and a detection signal is transmitted to the control device 9.

The striker 6 performs a closing operation from the locked state described above. As shown in FIG. 6, the motor 71 of the closer driver 7 is driven by the control device 9, whereby the cable 72 is pulled. This moves the striker 61 is moved in a direction indicated by an arrow D in FIG. 6 from the pop-up position toward the closing position, and the trunk lid 2 is also moved to the closed position. As a result of the striker 61 being disposed in the closing position, the hook 63, which is biased by the torsion spring 69, is moved in a direction indicated by an arrow E in FIG. 6 from the releasing position toward the locking position, whereby the locking claw 68 of the hook 63 enters the second engagement hole 66b of the striker 61. This locks the striker 61 in the closing position, whereby the trunk lid 2 is held in the closed state.

The striker device 6 performs a pop-up operation when the trunk lid 2 is held in the closed state. As shown in FIG. 7, the motor 81 of the release driver 8 is driven by the control device 9, whereby the arm 82 is pulled. This moves the hook 63 in a direction indicated by an arrow F in FIG. 7 from the locking position toward the releasing position, whereby the locking claw 68 of the hook 63, which is in engagement with the second engagement hole 66b of the striker 61, is dislocated from the second engagement hole 66b. As a result of the locking claw 68 being dislocated from the second engagement hole 66b, the striker 61, which is biased by the biasing member 62, is moved in a direction indicated by an arrow G in FIG. 7 from the closing position toward the pop-up position. Then, the trunk lid 2 is pressed against by the striker 61 and is caused to pop up. A pop-up of the trunk lid 2 is detected by a switch that is switched ON or OFF when the striker 61 is moved to the pop-up position, and a detection signal is transmitted to the control device 9.

Figure 8A:
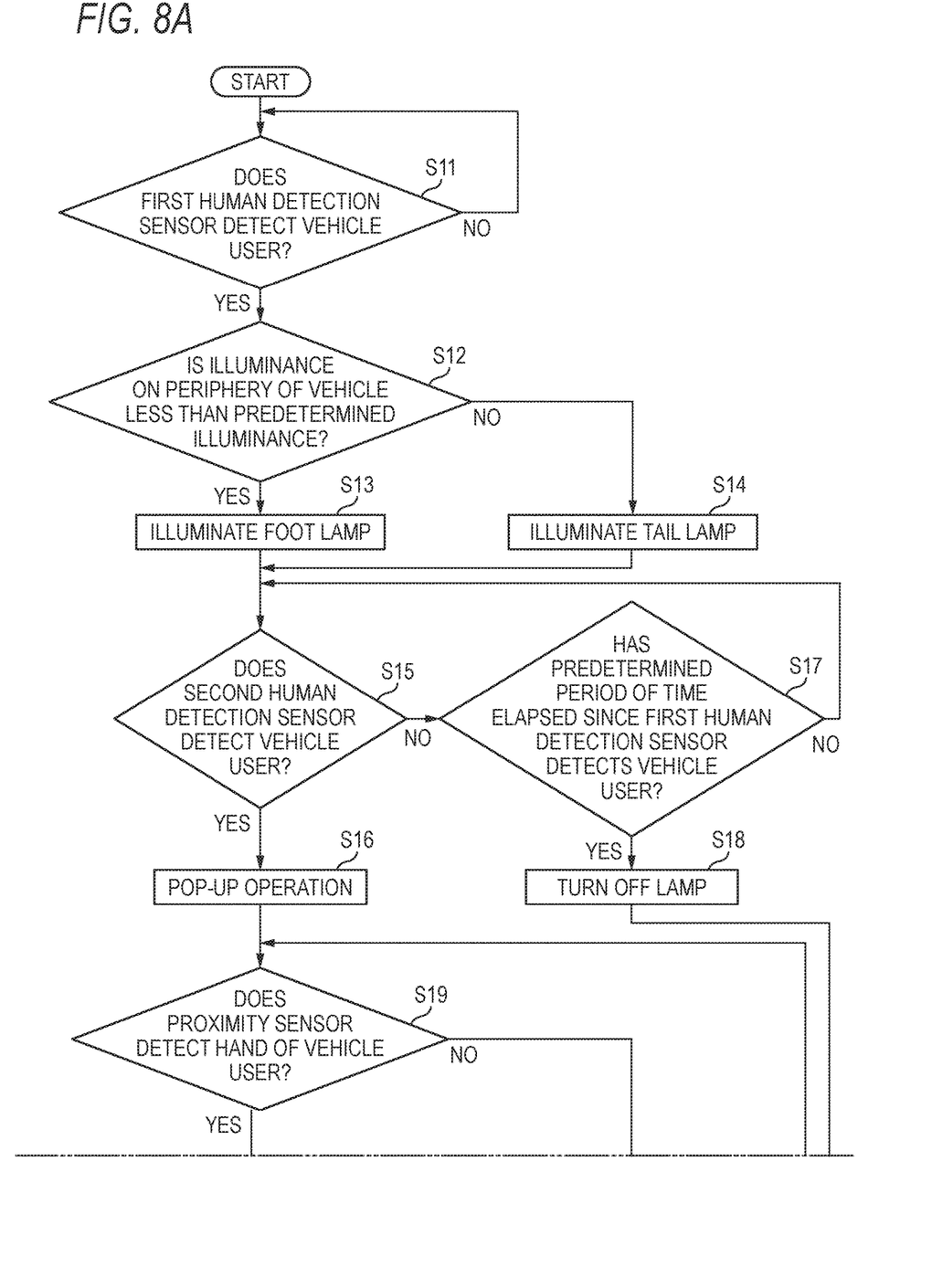
FIGS. 8A and 8B show a flow chart of processing executed by a control device of the opening and closing system shown in FIG. 2.
Figure 8B:
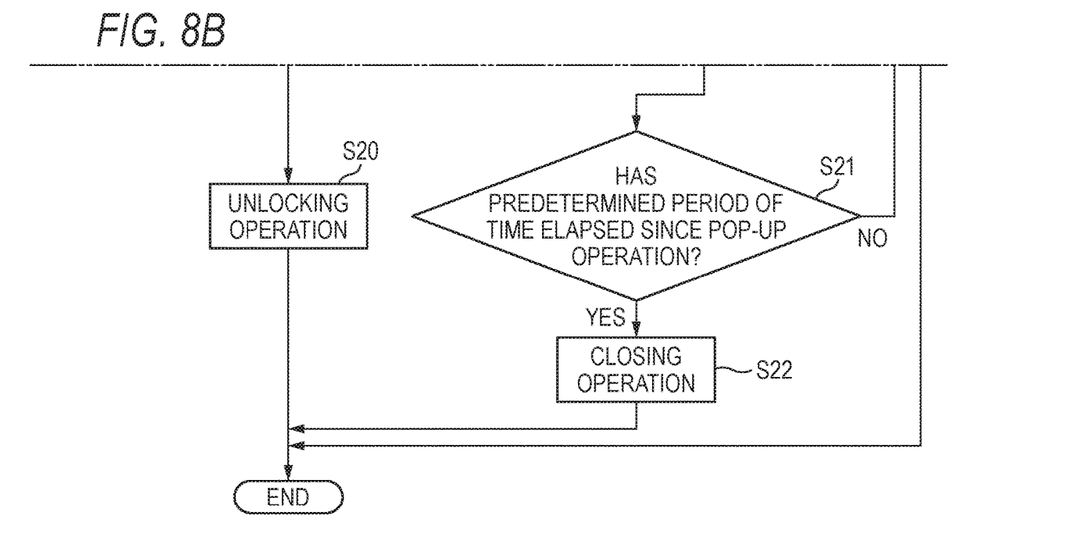
Figure 9:
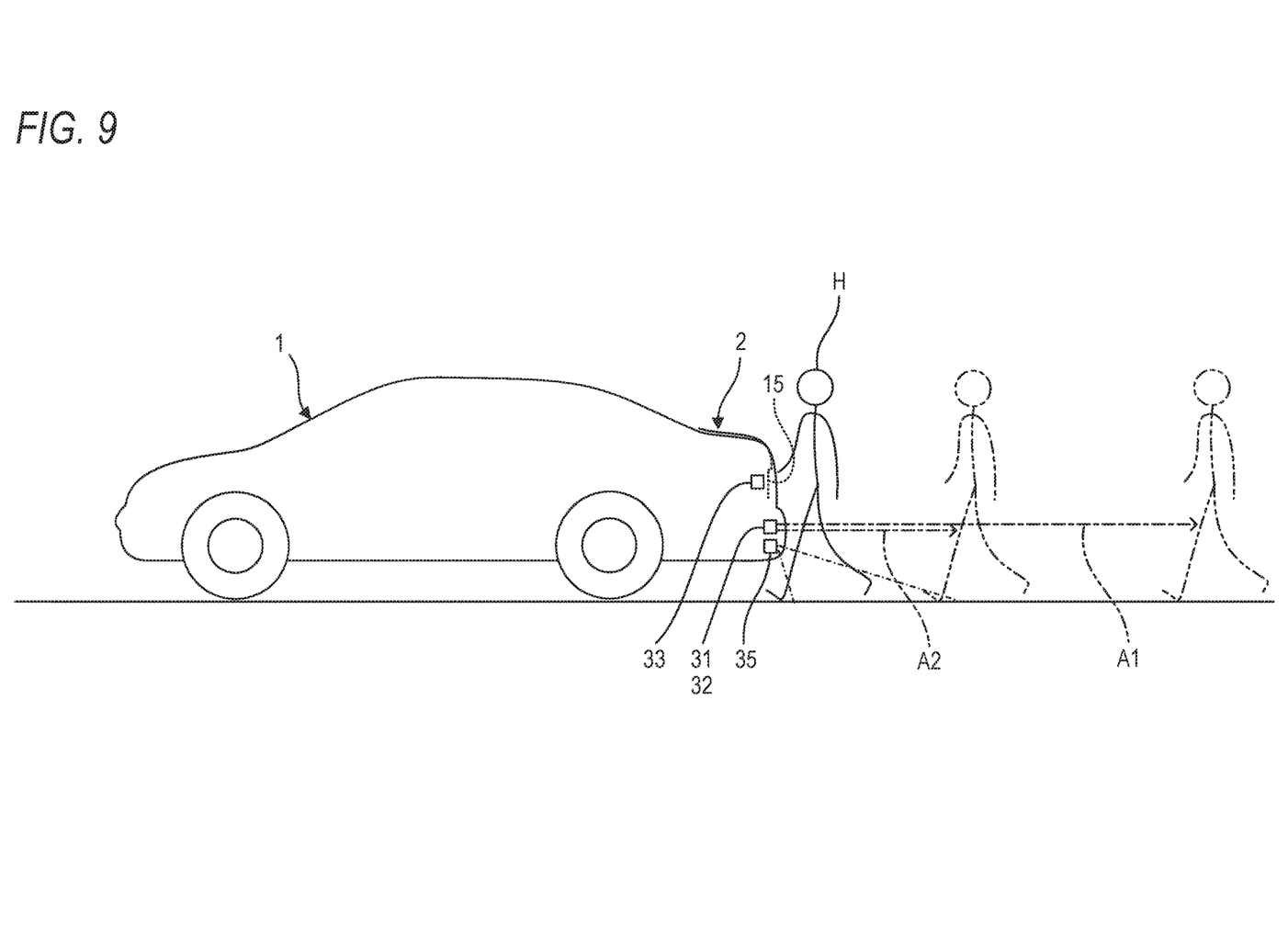
FIG. 9 is a schematic diagram explaining an operation of the opening and closing system shown in FIG. 2.

Next, referring to FIGS. 8A, 8B and 9, the operation of the opening and closing system 3 will be described.

Firstly, let's assume that the trunk lid 2 is held in the closed state. In step S11, the control device 9 determines whether a human being is detected by the first human detection sensor 31 and also determines whether the human being detected by the first human detection sensor 31 is a vehicle user H. Let's assume that the vehicle user H holds a key that holds an ID specific to the vehicle 1 and that can transmits the ID through a wireless communication. Then, the control device 9 receives the ID and determines based on the ID whether the human being who enters the first area A1 is the vehicle user H. Then, if the control device 9 determines based on the results of the determination that the vehicle user H is detected by the first human detection sensor 31, that is, that the vehicle user H enters the first area A1, the control device 9 proceeds to step S12.

In step S12, the control device 9 determines based on an illuminance detected by the illuminance sensor 34 whether the illuminance (the brightness) on the periphery of the vehicle 1 is less than a predetermined illuminance. If the control device 9 determines that the illuminance on the periphery of the vehicle 1 is less than the predetermined illuminance, the control device 9 proceeds to step S13. In step S13, the control deice 9 illuminates the foot lamp 35. On the other hand, if the control device 9 determines that the illuminance on the periphery of the vehicle 1 is the predetermined illuminance or greater, the control device 9 proceeds to step S14. In step S14, the control device 9 illuminates the tail lamps 14. When the illuminance on the periphery of the vehicle 1 is less than the predetermined illuminance, the foot lamp 35 is illuminated to illuminate an area corresponding to the second area A2 on the ground on the periphery of the trunk lid 2. Thus, even though the vision of the vehicle user H is limited as at night, the vehicle user H can be guided to the second area A2 defined on the periphery of the trunk lid 2. On the other hand, when the illuminance on the periphery of the vehicle 1 is the predetermined illuminance or greater, it is more effective to illuminate the tail lamps 14 as the indicator lamp than illuminating the foot lamp 35 to illuminate the ground in consideration of the visibility of the vehicle 1.

Then, the control device 9 starts to control the unlocking operation of the lock device 4, the closing operation of the striker device 6, and the pop-up operation of the striker device 6 when the foot lamp 35 or the tail lamps 14 are illuminated as a starting point.

Firstly, in step S15, the control device 9 determines whether the second human detection sensor 32 detects the vehicle user H. If the control device 9 determines that the second human detection sensor 32 does not detect the vehicle user H, the control device 9 proceeds to step S17. In step S17, the control device 9 determines whether a predetermined period of time has elapsed since the first human detection sensor 31 detected the vehicle user H. It can be understood that the vehicle user H has no intention to open the trunk lid 2 unless the second human detection sensor 32 detects the vehicle user H until the predetermined period of time elapses since the detection of the vehicle user H by the first human detection sensor 31. Then, if the control device 9 determines that the predetermined period of time has elapsed, the control device 9 proceeds to step S18, where the control device 9 turns off the foot lamp 35 or the tail lamps 14 and end the processing.

If the control device 9 determines in step S17 that the predetermined period of time has not yet elapsed, the control device 9 returns to step S15. In step S15, if the control device 9 determines that the second human detection sensor 32 detects the vehicle user H, that is, that the vehicle user H enters the second area A2, the control device 9 proceeds to step S16. In step S16, the control device 9 drives the motor 81 of the release driver 8, causing the striker device 6 to perform the pop-up operation (refer to FIG. 7) described above. This causes the trunk lid 2 to pop up.

Subsequently, in step S19, the control deice 9 determines whether the proximity sensor 33 detects the hand of the vehicle user H. If the control device 9 determines that the proximity sensor 33 does not detect the hand of the vehicle user H, the control device 9 proceeds to step S21. In step S21, the control device 9 determines whether a predetermined period of time has elapsed since the pop-up operation of the striker device 6. Unless the proximity sensor 33 detects the hand of the vehicle user H until the predetermined period of time elapses since the detection of the vehicle user H by the second human detection sensor 32, it can be understood that the vehicle user H has no intention to open the trunk lid 2. Then, if the control device 9 determines that the predetermined period of time has elapsed, the control device 9 proceeds to step S22, where the control device 9 drives the motor 71 of the closer driver 7, causing the striker device 6 to perform the closing operation (refer to FIG. 6) and ends the processing. The trunk lid 2, which is caused to pop up to open, is automatically returned to the closed position through the closer operation.

If the control device 9 determines in step S21 that the predetermined period of time has not yet elapsed, the control device 9 returns to step S19. In step S19, if the control device 9 determines that the proximity sensor 33 detects the hand of the vehicle user H, that is, that the vehicle user H moves a user's hand toward the operation portion 15 of the trunk lid 2, the control device 9 proceeds to step S20. In step S20, the control device 9 drives the motor 51 of the lock driver 5, causing the lock device 4 to perform the unlocking operation (refer to FIG. 4). The trunk lid 2 has already been unlocked at the point in time when the vehicle user H places the user's hand on the operation portion 15, whereby the trunk lid 2 can be opened without any delay.

In this way, with the opening and closing system 3, the foot lamp 35 or the tail lamps 14 are illuminated when the first human detection sensor 31 detects the vehicle user H who enters the first area A1 defined on the periphery of the vehicle body 11, and the operation of the lock device 4 that performs the unlocking operation, the operation of the striker device 6 that performs the closing operation, and the operation of the striker device 6 that performs the pop-up operation are started when the foot lamp 35 or the tail lamps 14 are illuminated as the starting point. This can reduce the waiting time of the vehicle user H that has to be spent until the trunk lid 2 can be opened, thereby making it possible to enhance the convenience of the opening and closing system 3.

With the opening and closing system 3, since the striker device 6 performs the pop-up operation when the second human detection sensor 32 detects the vehicle user H who enters the second area A2 defined on the periphery of the trunk lid 2 and the second human detection sensor 32 detects the vehicle user H within the predetermined period of time since the detection of the vehicle user H by the first human detection sensor 31, the trunk lid 2 can be prevented from being caused to pop up to open inadvertently, thereby making it possible to enhance the reliability of the opening and closing system 3.

With the opening and closing system 3, since the lock device 4 performs the unlocking operation when the proximity sensor 33 provided on the operation portion 15 of the trunk lid 2 detects the hand of the vehicle user H moving toward the operation portion 15, labor hours involved in searching for the unlocking switch and labor hours involved in operating the unlocking switch can be saved, thereby making it possible to enhance further the convenience of the opening and closing system 3.

With the opening and closing system 3, since the striker device 6 performs the closing operation to automatically return the trunk lid 2 to the closed position unless the proximity sensor 33 detects the hand of the vehicle user H within the predetermined period of time since the pop-up operation of the striker device 6, the convenience of the opening and closing system 3 can be enhanced further.

The foregoing description of the illustrative embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

REFERENCE SIGNS LIST 1 vehicle
2 trunk lid
3 opening and closing system
4 lock device
5 lock driver
6 striker device
7 closer driver
8 release driver
9 control device
11 vehicle body
12 lid frame
13 rear bumper
14 tail lamp
15 operation portion
31 first human detection sensor
32 second human detection sensor
33 proximity sensor
34 illuminance sensor
35 foot lamp
41 latch
42 ratchet
43 lever
44 base
45 case
46 locking groove
47 coil spring
51 motor
52 worm
53 worm wheel
61 striker
62 biasing member
63 hook
64 base
65 slider portion
66 engagement portion
68 locking claw
69 torsion spring
71 motor
72 cable
81 motor
82 arm
A1 first area
A2 second area
H vehicle user

What is claimed is:

1. An opening and closing system comprising:
(A) a lock device provided on a vehicle door, the lock device being configured to lock the vehicle door in a closed state and to perform an unlocking operation;
(B) a striker device provided on a vehicle body, the striker device being configured to perform:
a closing operation comprising moving the vehicle door to a closed position; and
a pop-up operation comprising moving the vehicle door in an opening direction from the closed position to a pop-up position;
(C) a first human detection sensor configured to detect a vehicle user who enters a first area defined on a periphery of the vehicle body;
(D) at least one lamp visible by the vehicle user who enters the first area; and
(E) a control device configured to:
control the unlocking operation of the lock device, the closing operation and the pop-up operation of the striker device, and switching on and off of the lamp;
in a case the vehicle user is detected by the first human detection sensor, switch on the lamp; and
in response to the lamp being switched on, start the controlling of the unlocking operation of the lock device and the closing operation and the pop-up operation of the striker device;
(F) a second human detection sensor configured to detect the vehicle user who enters a second area defined on a periphery of the vehicle door, and,
(G) an illuminance sensor configured to detect an illuminance on the periphery of the vehicle body,
wherein in a case the vehicle user is detected by the second human detection sensor within a predetermined period of time since the vehicle user is detected by the first human detection sensor, the control device is configured to control the striker device to perform the popup operation; wherein the lamp comprises a foot lamp configured to illuminate an area corresponding to the second area on a ground on the periphery of the vehicle door; and wherein the lamp comprises an indicator lamp provided on the vehicle door, and
wherein the control device is configured to:
in a case an illuminance detected by the illuminance sensor is less than a predetermined illuminance, switch on the foot lamp; and
in a case the illuminance detected by the illuminance sensor is equal to or greater than the predetermined illuminance, switch on the indicator lamp.

2. The opening and closing system according to claim 1, further comprising:
a proximity sensor provided on an operation portion of the vehicle door,
wherein in a case the vehicle user is detected by the proximity sensor after the striker device performing the pop-up operation, the control device is configured to control the lock device to perform the unlocking operation.

3. The opening and closing system according to claim 2, wherein in a case the vehicle user is not detected by the proximity sensor within a predetermined period of time since the striker device performed the pop-up operation, the control device is configured to control the striker device to perform the closing operation.

4. The opening and closing system according to claim 1, wherein the striker device comprises:
a striker configured to be brought into engagement with the lock device and movable between a first position corresponding to the closed position and a second position corresponding to the pop-up position;
a biasing member configured to bias the striker from the first position toward the second position;
a closer driver configured to move the striker from the second position to the first position;

a hook configured to lock the striker that is disposed in the first position; and a release driver configured to release an engagement of the hook with the striker.

* * * * *